(12) United States Patent
Caliari

(10) Patent No.: US 8,695,448 B2
(45) Date of Patent: Apr. 15, 2014

(54) SYSTEM FOR MOVING A CARRIAGE ALONG A GUIDE

(75) Inventor: Franco Caliari, Brescia (IT)

(73) Assignee: SYS TEC S.r.l., Brescia (IT)

( * ) Notice: Subject to any disclaimer, the term of this patent is extended or adjusted under 35 U.S.C. 154(b) by 904 days.

(21) Appl. No.: 12/300,097

(22) PCT Filed: Jun. 9, 2006

(86) PCT No.: PCT/IT2006/000432
§ 371 (c)(1),
(2), (4) Date: Aug. 24, 2010

(87) PCT Pub. No.: WO2007/129347
PCT Pub. Date: Nov. 15, 2007

(65) Prior Publication Data
US 2011/0120241 A1    May 26, 2011

(30) Foreign Application Priority Data
May 9, 2006  (WO) ............. PCT/IT2006/000339

(51) Int. Cl.
*F16H 29/20*   (2006.01)
(52) U.S. Cl.
USPC ........... 74/25; 74/23; 74/21; 74/20; 74/24; 74/89.17

(58) Field of Classification Search
USPC .............. 74/89.17, 20, 21, 23–25
See application file for complete search history.

(56) References Cited

U.S. PATENT DOCUMENTS

| | | | | |
|---|---|---|---|---|
| 3,793,952 | A | * | 2/1974 | Neumann et al. ............. 101/157 |
| 3,933,349 | A | * | 1/1976 | Limberger et al. ......... 271/10.11 |
| 3,937,918 | A | * | 2/1976 | Robertson ................ 219/124.31 |
| 4,550,626 | A | | 11/1985 | Brouwer |
| 4,592,260 | A | * | 6/1986 | Gabathuler et al. ............. 83/74 |
| 4,621,430 | A | | 11/1986 | Lenz |
| 5,411,334 | A | | 5/1995 | Takei et al. |
| 5,547,330 | A | * | 8/1996 | Walimaa et al. ........... 414/749.6 |
| 6,494,138 | B1 | * | 12/2002 | Gottling et al. ............... 101/479 |
| 6,675,707 | B1 | * | 1/2004 | Heiler et al. .................. 101/216 |

* cited by examiner

*Primary Examiner* — Rita Leykin
(74) *Attorney, Agent, or Firm* — Shoemaker and Mattare

(57) ABSTRACT

A system for moving a carriage along a guide comprises:
- at least one sliding block that slidingly connects the carriage to the guide;
- a control shaft associated to the carriage;
- a driving unit suitable for moving said control shaft in rotation; and
- rotary-translatory connecting means between said control shaft and said guide.

The control shaft is movable between a working position wherein it is connected to said guide for moving the carriage by said driving unit, and an idle position wherein it is disconnected from said guide for free manual pulling of the carriage through said at least one sliding block.

33 Claims, 6 Drawing Sheets

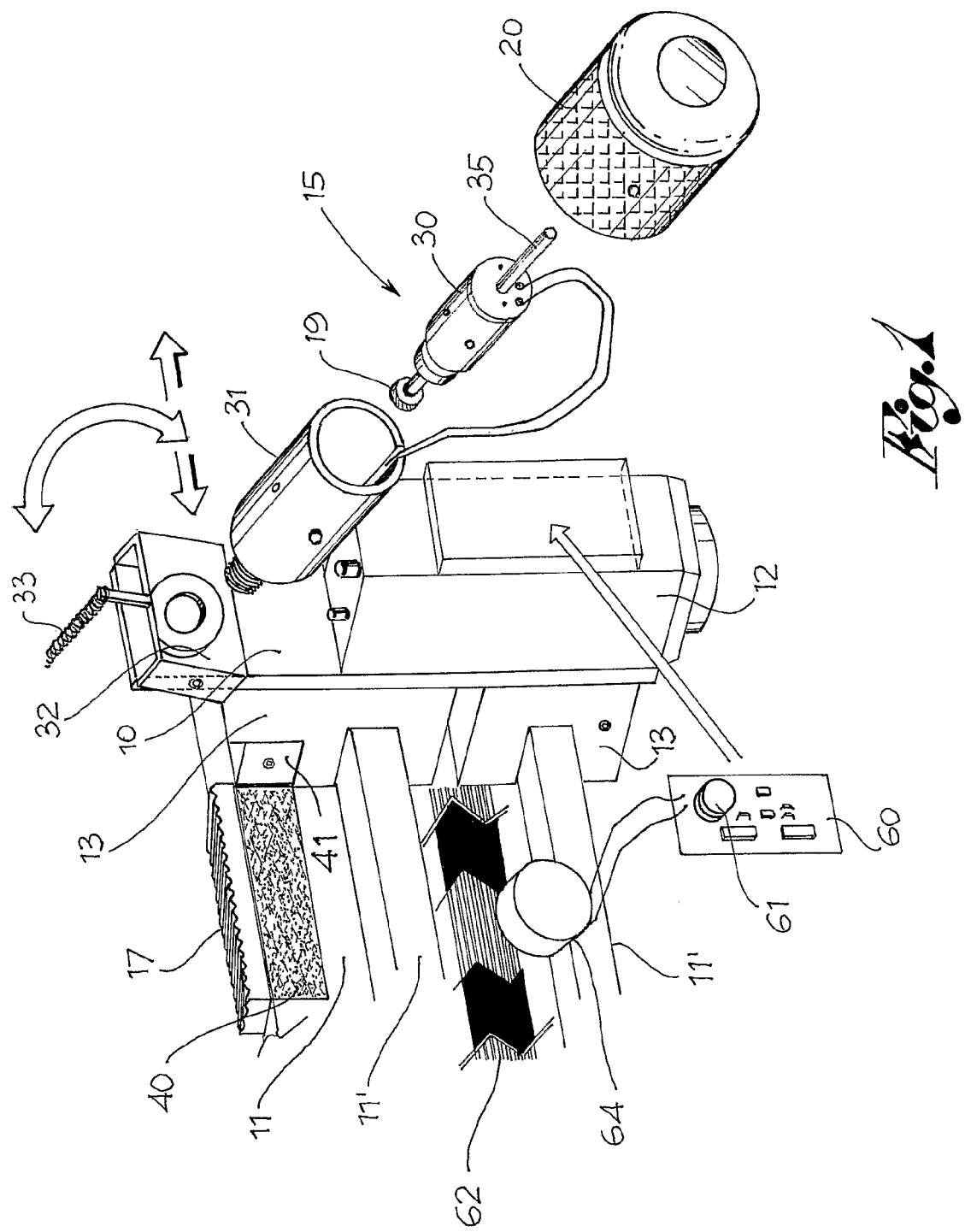

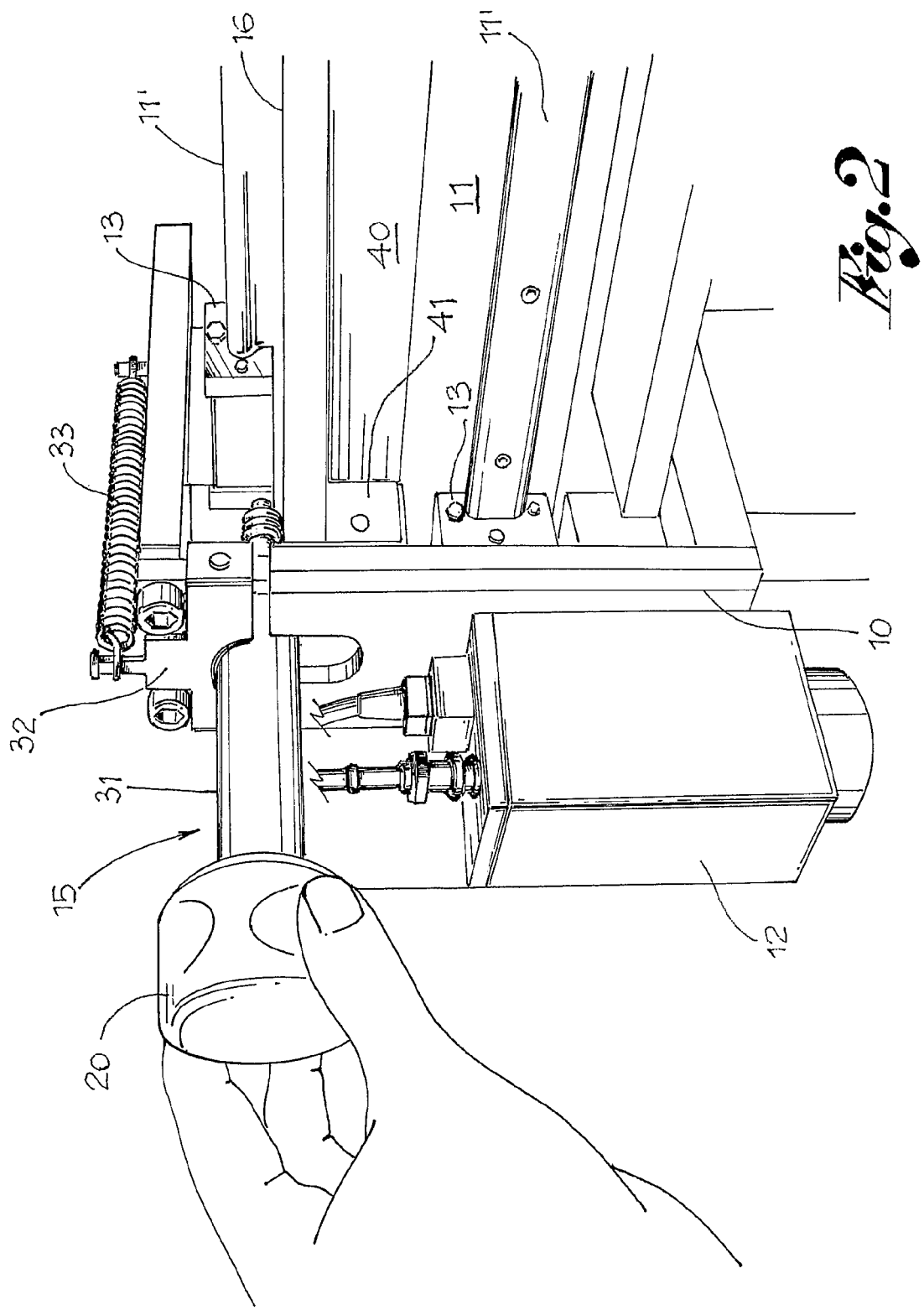

SYSTEM FOR MOVING A CARRIAGE ALONG A GUIDE

FIELD OF THE INVENTION

The object of the present invention is a system for moving a carriage along a guide and an equipment using such moving system.

PRIOR ART

By way of an example, pieces of equipment that can use a system for moving a carriage according to the present invention are assembly machines, inspection and control machines, cutting machines, flexographic printing machines, or other machines wherein it is necessary to move a device, such as a camera, a laser pointer, a blade, along a direction usually but not necessarily rectilinear defined by a guide (also called linear axis) and stop said device in a predetermined position.

It is known that a carriage can be made to slide along a guide in a manual or motor-driven mode. In turn, the motor-driven sliding can take place with a control of the position in open loop or in closed loop by encoder or other position sensors.

With systems provided with manual movement, the carriage is manually moved to the desired position with an approximate degree of accuracy.

Also with the aid of dimensions display systems, this requires adjustments by the operator which bring to a considerable increase of the time required for precisely reaching a certain position, with economical disadvantages especially on repetitive operations wherein continuous movements and positioning are required.

With motor-driven systems wherein the movement is carried out manually, that is, by simply pressing an actuating button, the principle is the same as described above, wherein in order to stop the carriage in a certain position, in this case it is necessary to make some corrections forward or backward until the value is reached with the desired accuracy.

Also this solution requires time and attention by the operator, thus making the operation not competitive when there are repetitive operations with much positioning.

Moreover, only a limited number of carriages can be mounted on the same axis due to the need of having all the mechanical gears, besides the motion driving motors, coexist for every single carriage.

Such solution therefore is not very flexible since it is possible to move only one carriage at a time, and one is bound to the maximum speed allowed by the drive or motor the system is interlocked to.

With fed back systems, for example of the CNC type, the carriage automatically moves to the desired position. This requires the presence of a mechanical device, such as a ball recirculation screw with bearings and bearing holders, connected to a motor and to a position sensor (Encoder) and connected to the carriage by a suitable lead nut, besides further mechanical gears.

This solution is mechanically and electronically very expensive and exhibits all the disadvantages of the previous solution, in particular the limited number of carriages on the same axis due to the need of having all the mechanical gears besides the motion driving and position control motors and encoders, coexist for every single carriage.

A further problem arises from the fact that all the mechanical gears must then be sized on the basis of several parameters, some of which are:

the maximum stroke required for the carriage;
the maximum speed to be reached (to minimise the idle time given by the movement);
the carriage weight with any devices mounted thereon.

Based on these parameters, it is for example possible to deduce these sizes:

a ball recirculation screw with 10 mm diameter is required for 100 mm movements;
a ball recirculation screw with 16 mm diameter is required for 1000 mm movements;
a screw with 20 or 25 mm diameter is required for 2000 mm movements.

Based on the sizing of the mechanical gears, all the connected gears must be sized, such as lead nuts, pulleys, belts, gears (if used), etc., besides of course the motors with the relevant drives. Of course, the costs of the system are directly proportional to the sizing of the same.

A further limitation of these linear axes is given by the fact that it is not possible to make systems with more than two carriages on the same axis, but by undergoing:

Expensive feasibility studies and design
Need of limited tolerances and higher overall precision
High purchasing costs (screws, lead nuts, joints, pulleys, etc.)
High costs for considerably more complex equipment
High production costs (time required for mechanical machining)
High manufacturing and assembly costs
Larger production lots, suitable for the economical profit for both the tooling and the expenses incurred.

In any case, the number of carriages that can be moved is always limited by the space physically needed for all the mechanical gears intended for moving the single carriages, these gears being external to the carriage itself.

SUMMARY OF THE INVENTION

The object of the present invention is to provide a system for moving at least one carriage along a guide which should be capable of remedying the disadvantages mentioned above.

Said object is achieved with a system for moving a carriage along a guide according to claim 1.

The idea at the basis of the present invention that allows overcoming the mechanical constraints described above with reference to the current moving systems is that of internally providing every single carriage with everything that is needed for the movement and positioning thereof.

Thanks to this solution, in theory the number N of carriages that can be mounted on the same guide is given by the formula:

$N$=guide length/physical width of the carriage.

For example, if the guide is 1000 mm long and the carriages have a width of 90 mm, up to 10 carriages can be mounted on the guide.

The moving system according to the invention is especially advantageous if the guide is provided with a detecting band carrying an absolute position signal detectable by a sensor mounted on each carriage, as is for example described in PCT/IT2005/000052, by the same Applicant. In fact, this embodiment allows having a single reference sensor of the position of all carriages, thus avoiding all the mechanical gears relating to the position detection connected to a single carriage, which would limit the maximum number of carriages usable as described above.

In accordance with a particularly advantageous embodiment, it is possible to integrate both the manual and the motor-driven movement, with the advantage that it is possible to manually and immediately move the carriages in the proximity of the desired position without being limited by the maximum possible speed of the motor.

In accordance with a preferred embodiment, every single carriage, once returned to motor-driven mode, by communicating with the electronic control system automatically moves to a position previously entered or stored by self-learning.

It is possible to use small and inexpensive motors that can even be seated in a manual moving knob since there are no mechanical inertia and masses to move.

The system described allows the utmost flexibility and accuracy in several applications such as measurement systems, cutting systems with multiple blades and mounting systems.

The operating speed becomes very high, since the operator needs not spend time and attention to centre the carriages, especially with the use of a high number of carriages provided with camera or other devices on the machine.

The advantages of the moving system according to the invention can be summarised as follows:

possibility of moving and positioning all the carriages that can physically be on a certain guide in automated and controlled manner;

simplicity of design and standardised parts, irrespective of the guide length;

no mechanical and structural sizing of the guide and carriage, since this is not related and constrained anymore to the mechanical gears depending on the length of the linear axis;

moderate cost of all the mechanical components, as the more expensive ones have been eliminated, such as: screws, lead nuts, joints, pulleys, bearings, etc.;

expensive equipment for mechanical machining is not required anymore;

the simplification and reduction of the parts allows significant saving of machining cost and time;

simple and equal assemblies, not depending on the guide length;

the elimination of several mechanical parts mentioned above and the standardisation of those used, that are not related and sized on the basis of the linear axis length anymore, allow optimising the production lots and the stock on hand.

BRIEF DESCRIPTION OF THE DRAWINGS

Further details and advantages of the moving system according to the invention will appear more clearly from the following description of a preferred embodiment thereof, made by way of an indicative non-limiting example with reference to the annexed drawings, wherein:

FIG. 2 shows an embodiment variation of the moving system;

FIG. 7 shows a perspective schematic view of the moving system according to a further embodiment variation.

DETAILED DESCRIPTION OF THE INVENTION

Figure 3:
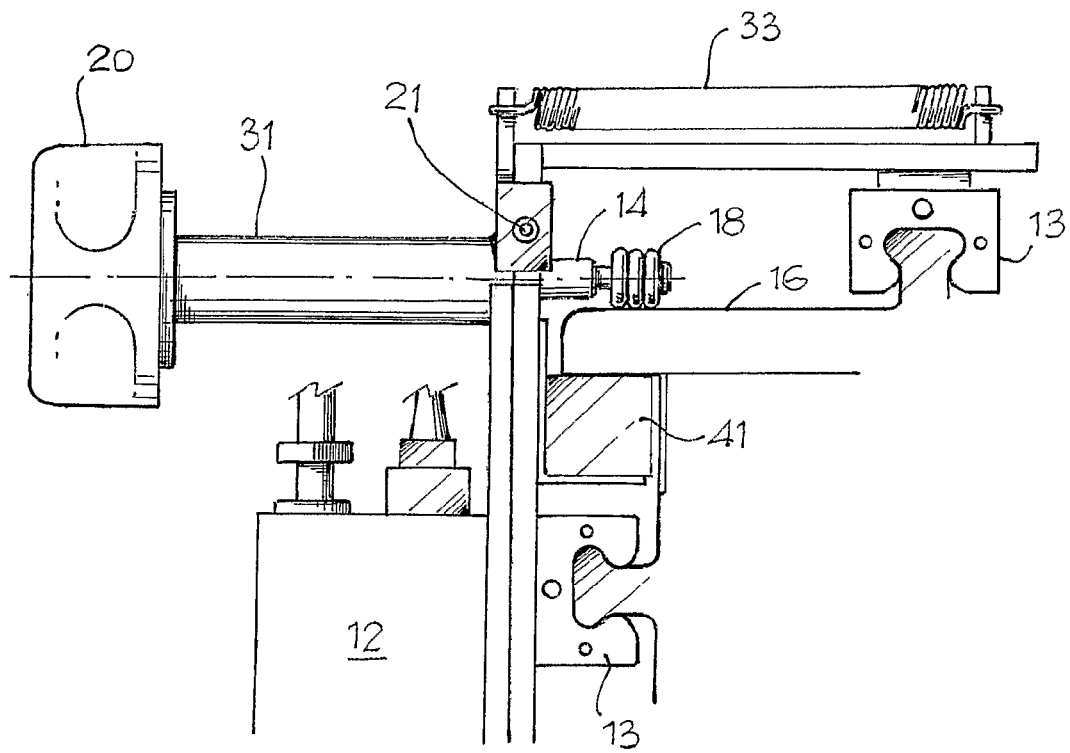
FIG. 3 shows a view of the moving system of FIG. 2, in motor-driven movement mode.
Figure 4:
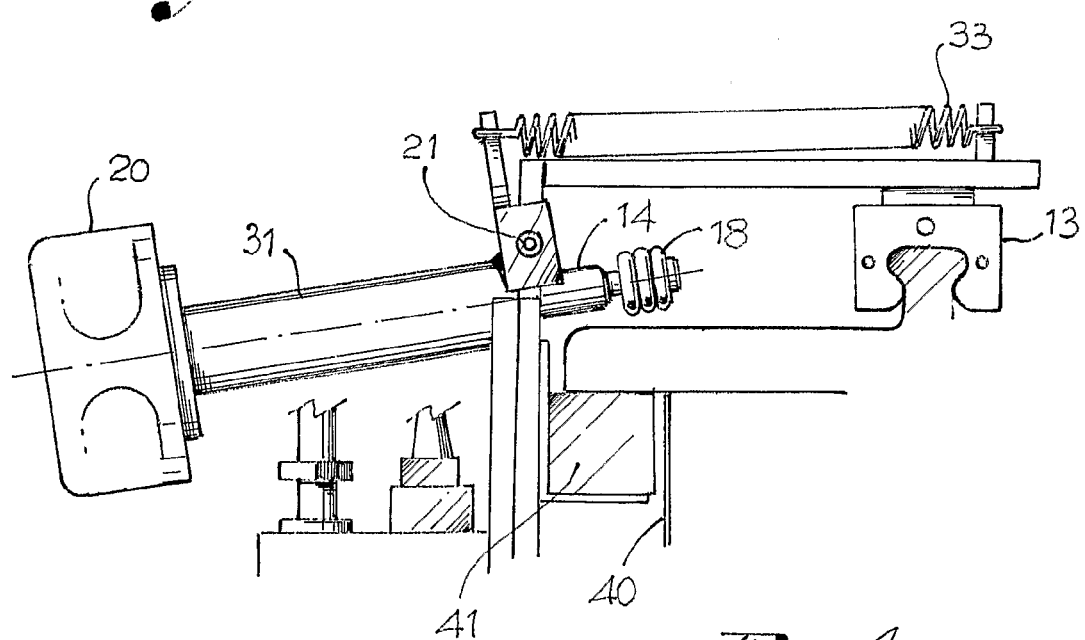
FIG. 4 shows a view similar to the previous one, but in manual movement mode.
Figure 5:
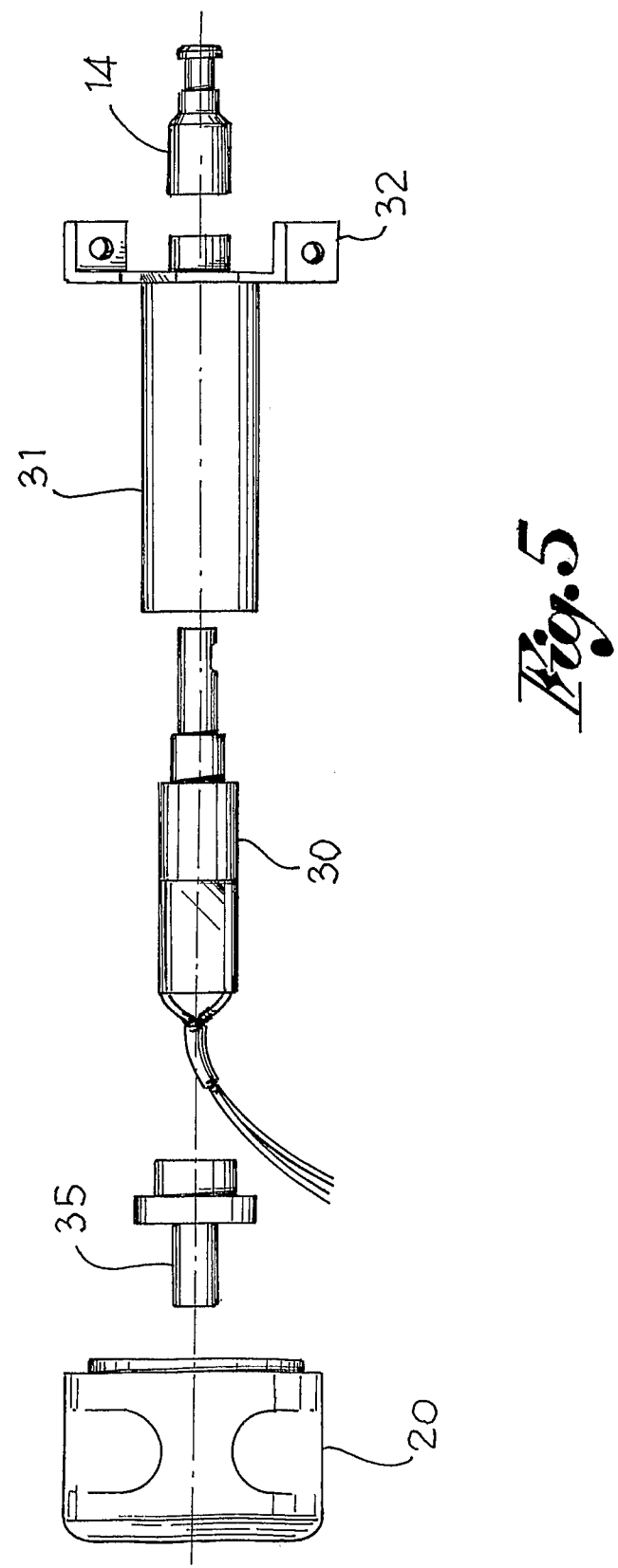
FIG. 5 shows an exploded view of the carriage control unit only.

In said drawings, reference numeral 10 denotes a carriage suitable for sliding along a guide 11 for moving a device 12 in a direction defined by said guide 11. For example, said device 12 is a camera suitable for framing portions of an object facing guide 11, such as a flexographic plate in the case of a machine for flexographic printing lines. Guide 11 for example is a rectilinear guide, also called linear axis, and carriage 10 must be able to move forward and backward along said axis and stop in a predetermined position, for example stored in advance.

Carriage 10 is slidingly connected to guide 11 through at least one sliding block 13. More in detail, guide 11 exhibits at least one guide profile 11', for example substantially shaped as a T, to which sliding block 13 of the carriage connects, which therefore substantially exhibits a C shape.

In a preferred embodiment, carriage 10 substantially exhibits an L shape and is provided with two sliding blocks 13 sliding on two surfaces of guide 11 orthogonal to one another, so as to ensure an accurate and steady positioning of device 12 relative to the object it is interlocked to.

Carriage 10 is further associated to a control shaft 14, a driving unit 15 suitable for moving in rotation said control shaft 14, and rotary-translatory connecting means between said control shaft 14 and guide 11. Said rotary-translatory connecting means are suitable for causing a forward movement of carriage 10 along guide 11 following a rotation of the control shaft 14.

In accordance with a general embodiment, the control shaft 14 is movable between a working position wherein it is connected to guide 11 through said connecting means for moving the carriage by said driving unit 15, and an idle position wherein it is disconnected from said guide for free manual pulling of the carriage through said at least one sliding block 13.

According to an embodiment, said rotary-translatory connecting means comprise a friction element 16, 17 associated to and extending along guide 11 and an annular element 18, 19 fitted on an end of the control shaft 14 and suitable for interacting with said friction element so as to obtain a rolling friction for moving the carriage subsequent to the rotation of said shaft.

Advantageously, said annular element 18 comprises at least one rubber wheel, such as an O-ring.

In an other embodiment, said rotary-translatory connecting means comprise a rack 17 associated to guide 11 and a pinion 19 keyed on an end of said control shaft 14.

Preferably, the movement of control shaft 14 at least between the working position and the idle position can be carried out by acting on said driving unit 15 of shaft 14.

More in particular, said driving unit 15 is provided with a gripping element 20, such as a knob, at an end thereof and control shaft 14 at the opposite end. Advantageously, the driving unit 15 is connected to carriage 10 by an oscillation pin 21 that enables the movement of control shaft 14 between the working position and the idle position. The oscillation can be obtained by simply manually pressing the gripping element 20 so as to lift the opposite end of the driving unit 15, that is, the end of control shaft 14 with the annular element.

Advantageously, the driving unit 15 is elastically influenced to remain and return to the position of connection of control shaft 14 to guide 11.

According to an embodiment, said driving unit 15 comprises means for manually moving the control shaft, or an electrical motor 30, or preferably both.

In accordance with a preferred embodiment, the electrical motor 30 is seated in a bush 31 hinged to a portion of the structure of carriage 10 by a support bracket 32. The control shaft 14 is connected to motor 30 and protrudes from an end of said bush 31. The gripping element 20 is provided at the opposite end of said bush 31.

Advantageously, said oscillating support bracket 32 is anchored to an elastic element 33, for example a spring, attached to the carriage structure and suitable for maintaining and returning the driving unit 15 to the working position.

In a preferred embodiment, control shaft 14 is suitable for receiving the motion from a driving shaft 35 that extends from bush 31 seating the electrical motor from the gripping element 20 end. In this embodiment, said gripping element 20 is keyed on said driving shaft 35 for a manual rotation of the control shaft 14.

In other words, with electrical motor deactivated (if present), it is possible to rotate the gripping element 20 so as to rotate driving shaft 35 and as a consequence, control shaft 14 connected thereto.

Advantageously, the connection between said two shafts 14 and 35 is obtained with a suitable velocity ratio, so that by rotating the gripping element 20, very small movements of the carriage are obtained so as to reach the predetermined position with a high accuracy.

Figure 6:
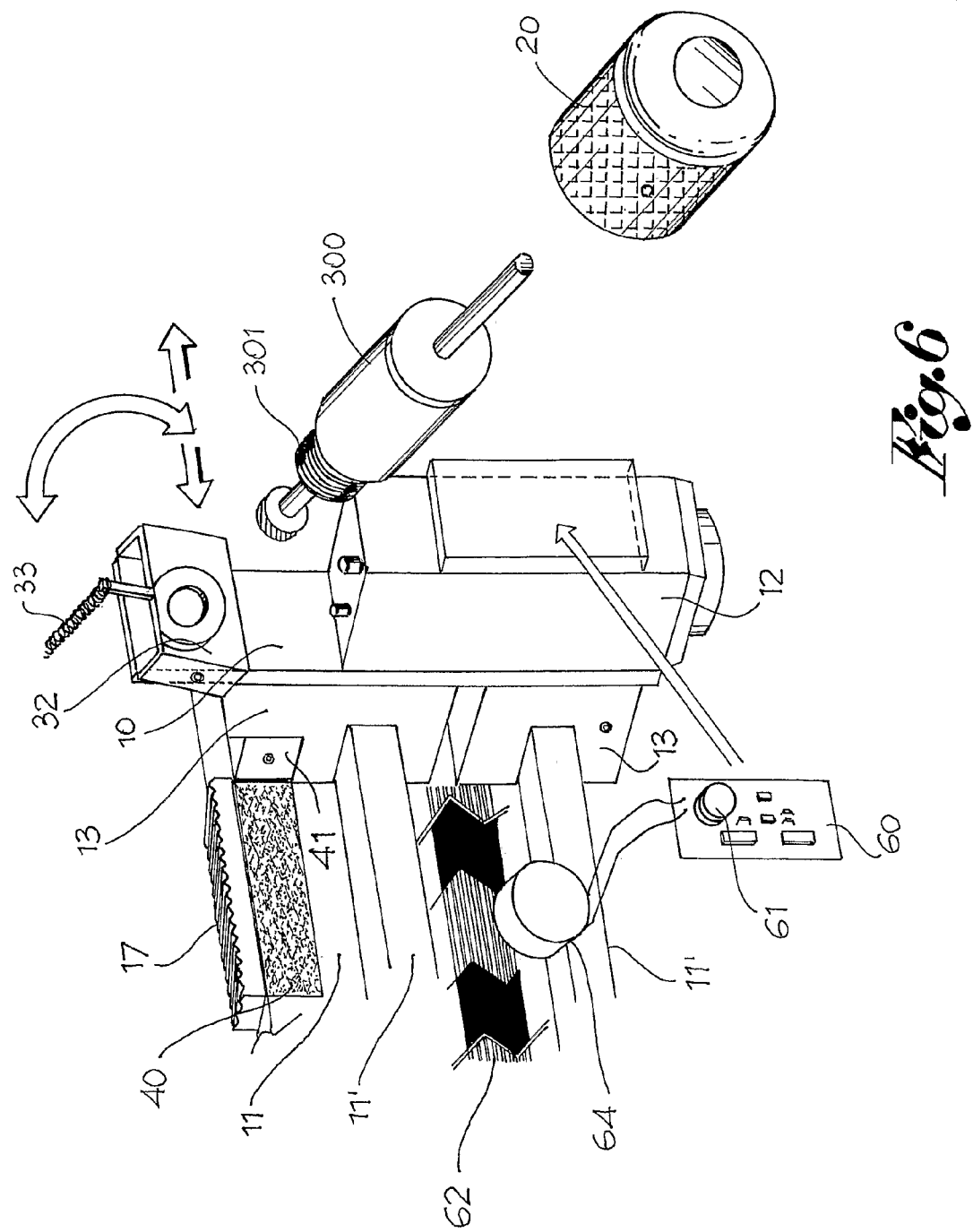
FIG. 6 shows a perspective schematic view of the moving system according to an embodiment variation.

In accordance with an other embodiment schematically shown in FIG. 6, motor 300 is directly attached to the oscillating bracket 32, without the need of bush 31. To this end, motor 300 exhibits a threaded portion 301 for screwing to bracket 32.

According to a further embodiment schematically shown in FIG. 7, poles 302 for powering motor 30 are connected on bush 31. The motor is provided with as many tracks 303 suitable for obtaining an electrical sliding contact with said powering poles and thus allowing the manual rotation of the body of motor 30. In this case, the gripping element is advantageously keyed directly on motor 30 and the presence of driving shaft 35 is not required anymore.

In fact, when motor 30 is in a locked state, it is possible to manually rotate the gripping element 20, which rotates the body of motor 30 and as a consequence, control shaft 14.

When motor 30 is electrically controlled and therefore is in a released state, gripping element 20 and motor body remain stationary while control shaft 14 is electrically rotated.

In accordance with a preferred embodiment, the system for moving the carriage according to the present invention further comprises a detecting band 40 associated to guide 11, parallel to the sliding direction of carriage 10, and carrying a position-signal variable on the basis of the distance from an end of said band defining a zero position, a detection sensor 41 integral with carriage 10 and suitable for detecting said position-signal, and a control unit (not shown) suitable for receiving information relating to the signal detected by said sensor and for providing information representing the carriage position relative to said zero position.

Advantageously, said sensor 41 is suitable for detecting the position signal without contacting band 40.

Advantageously, moreover, said sensor 41 is suitable for detecting the position signal in a substantially uninterrupted manner while carriage 10 is moved along guide 11.

In one embodiment, the detecting band 40 is a magnetic band and sensor 41 is a magnetic field sensor.

In an other embodiment, the detecting band 40 is an optical band and said sensor 41 is an optical sensor.

In accordance with an embodiment, the position-signal carried by the detecting band is of incremental type.

More preferably, and in particular in the case of multiple carriages 10 mounted on a single guide 11, the position-signal carried by the detecting band 40 is of absolute type.

In accordance with an embodiment, the control unit is associated to a unit for storing position values taken by carriage 10. Then, the control unit is suitable for comparing the value of the current position of the carriage with a stored position value, the carriage being controllable to be moved along guide 10 until the difference between said values decreases to zero. For example, the control unit is suitable for displaying on a screen the difference between the value of the current position taken by the carriage and the stored position value, called target-position, so that the operator can move carriage 10, manually or by the motor, until he/she sees such difference become zero.

In accordance with a preferred embodiment, the control unit is suitable for controlling by feedback the electrical motor for moving the carriage to a previously stored position. The control unit is therefore capable of acting on the speed of the carriage motor, slowing it down in the proximity of the target-position and stopping it at such position.

Advantageously, the motor power supply board is provided with a logic that manages two speeds, slow and fast. In fast movement mode, the carriage moves quickly in the selected direction. In slow movement mode, at each pressure of a direction button the motor only makes a little movement.

In accordance with a particularly advantageous embodiment, the control unit is programmed for switching the rotation speed of the electrical motor from fast to slow when the carriage approaches the target-position previously stored.

In fact, using the reading of the absolute position of the carriage (detected by reading the absolute position sensor), as the target-position is approached (in the practice, at a preset distance therefrom, for example 5 mm rather than 0.5 mm), the motor supply board is disconnected and switched into slow speed, for example by the pulse width modulation (PWM) technique, so that the operator can carry out a precision approach.

In brief, during the motor-driven movement each carriage 10 can be piloted in the two moving directions thanks to the rotary-translatory connecting means between the carriage and the guide.

Also without a closed loop control, it is possible with good accuracy to stop the motors in the proximity of the target-position and let the operator carry out the fine approach manually, thanks to the reduction gear between the driving shaft integral with the gripping element and the control shaft, or by the motor-driven movement in slow mode.

It should be noted that the control unit can move in the same direction all the motors connected (thus, all the devices installed on the axis); however, when any motor enters the respective target area, the selected moving speed switches into slow for all motors.

In the proposed moving system it is possible to immediately and at any time change into a manual fast movement, by disengaging the driving unit from the guide.

The operation takes place without releasing any mechanical gear or clutch, but simply acting on the gripping element 20 so as to lift the control shaft 14.

At this point it is sufficient to pull the carriage to the left or to the right.

The real time reading of the absolute position allows reaching or in any case approaching the target-position even faster than through the motor-driven movement.

Thus, if the carriage makes a movement of a certain extent in terms of distance (on a cliché mounting device it could be, for example, 70-80 cm), the manual movement allows saving much time as compared to motor-driven movement, if we consider for example that a motor has a typical speed of 1 m/min.

It should be noted that while motors move electrically, it is still possible to take one or more carriages at the same time and move them manually.

Moreover, it is possible to manually move a carriage while it is moving in motor-driven mode.

Therefore multiple carriages can simultaneously move on the same axis also by different movement methods (motor-driven and manual).

The absolute position real time reading system in any case allows detecting the real and absolute position of each carriage, thus with the possibility of independent feedback correction for each carriage.

In all the embodiments described so far, the carriages are released from the mechanical connection of the screw, required to move the carriage, to the relevant position transducer (encoder) required to detect the carriage position. By providing every single carriage with a motor, it is released from all the mechanical gears used in the current solutions used, allowing the mounting of multiple carriages at the same time on the same linear axis, all that can be controlled and fed back in movement and position.

Every carriage has no constraints or contacting mechanical gears for moving and for detecting the position and can be moved and positioned manually by pulling.

The only constraints that still remain between the carriages and the machine are the device connecting cables that can be mounted on the carriage itself, such as cameras, cutting knives, laser pointers, etc.

In the solution taken as an example of a machine for the flexographic mounting of clichés, the following cables can reach each carriage:

Cable for powering the devices mounted on the carriage and the camera;

Camera UHV cable;

Position sensor cable;

Cable for the serial control and management of the camera functions (according to the various current standards such as RS232-RS 422-RS485-Plug-In etc.);

Motor cable.

In accordance with an embodiment, all of these cables are connected to the machine control unit and to every single carriage through a catenary, that is a plastic chain that encloses them, protects them and guides them carrying them therein during the movement of the carriage itself.

These cables are expensive as they could be even several meters long, are provided with connectors on both sides, and require special machines for processing and inspection test.

These costs add up to the time required for laying the cables on the machine, which must be provided with special raceways, anchors and catenaries. The cables must then be connected to the corresponding equipment and the end testing of the entire equipment is then carried out.

All these operations can be carried out by specialised technical and professional personnel only.

According to another aspect of the invention, it is proposed to eliminate at least partly also this last constraint by powering and making all the devices present on the carriage communicate in a bidirectional manner with the control unit through a contact-less electromagnetic induction system.

Figure 1:
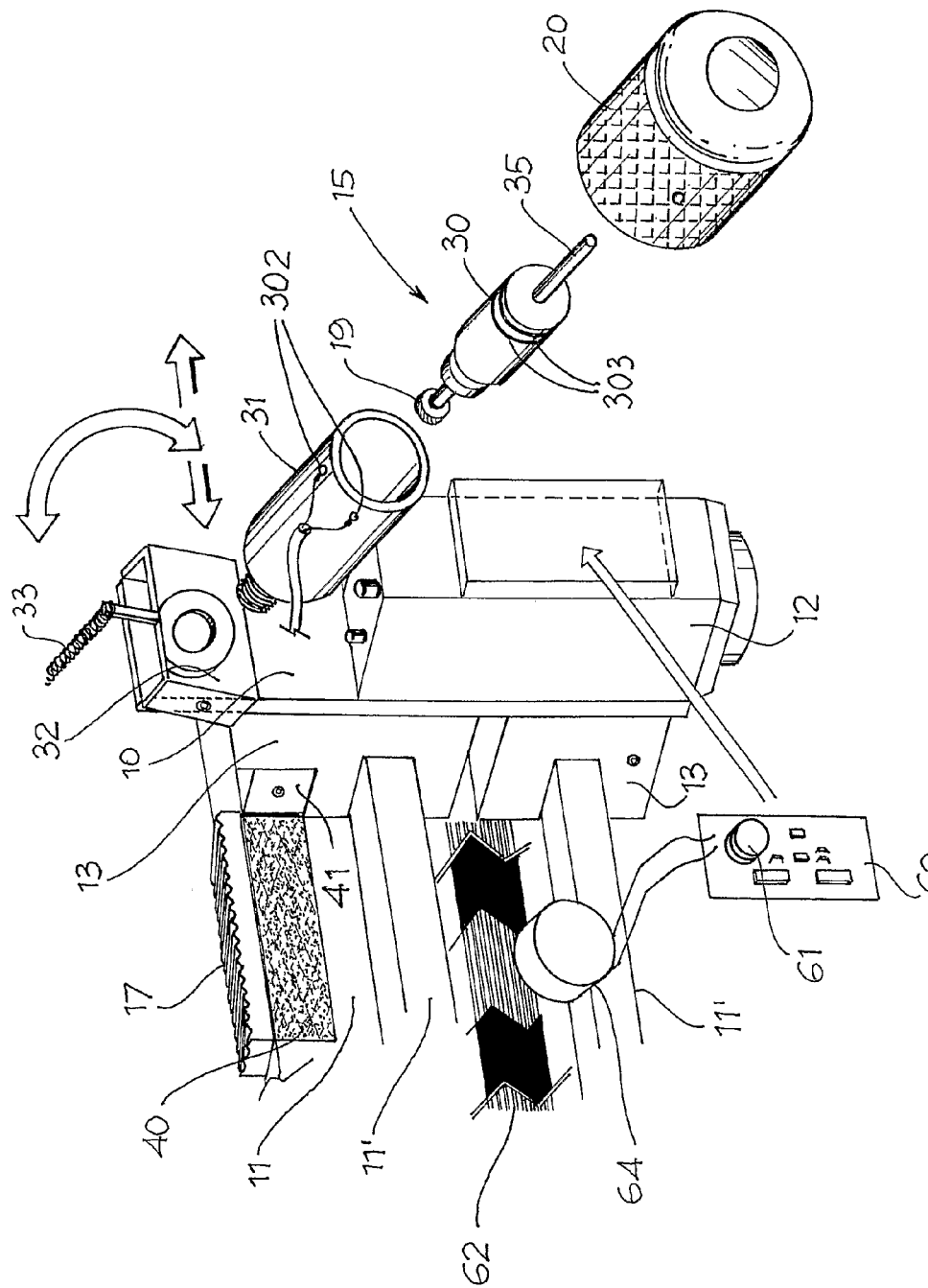
FIG. 1 shows a perspective schematic view of the system for moving a carriage along a guide according to the invention.

More precisely (FIG. 1), an electronic board with microprocessor 60, provided with a little accumulator 61 that is constantly recharged by the voltage generated by induction, controls all the functions the carriage is intended for.

The principle is based on the possibility of providing the machine with a transformer 62 that generates an inductor field and that can advantageously be of the flat type, based on a strip of special material long as the stroke of the carriage of the linear axis, on which a series of tracks are created that have the function of coils of a primary circuit.

As an alternative it is possible to use a real core on which the coils are wound.

The primary is powered and piloted with a frequency of at least 380 Khz or higher to have good energy performance.

The secondary circuit 64 of the transformer, which carries out the function of the induced circuit, is placed on the carriage. The voltage generated in such circuit is used to recharge the accumulator 61 provided on the electronic board 60, which will then see to all the energy requirements.

The secondary 64 of the transformer, which can be buried in a resin capsule, slides along the coils of the primary circuit 62 of the flat transformer at such a distance as to never contact it.

The inducer field can also be used for bi-directionally sending all the data and commands that are currently transmitted by cable. For example, the conveyed wave or width modulation technique may be used. These data are processed by the microprocessor located on the electronic board 60 that controls the management of the various processes and the devices.

With this solution, the following cables would therefore be eliminated:

Power supply cable

Position sensor cable

Cable for the serial control and management of the camera functions (according to the various current standards such as RS232-RS 422-RS 485-Plug-In etc.)

Motor cable.

A current limit to the use of the electromagnetic induction also for data transfer is the non-high baud-rate. Such induction system therefore cannot be already used to transfer the data acquired by the cameras.

However, to avoid wiring the cameras it is in any case possible to provide the electronic board 60 located on each carriage also with a wireless system for transmission and reception using one of the various standards currently used on the devices for Personal Computers.

It is evident that a man skilled in the art may make several changes and adjustments to the moving system according to the present invention in order to meet specific and incidental needs, all falling within the scope of protection of the invention as defined in the following claims.

The invention claimed is:

1. System for moving a carriage along a guide, comprising:
at least one sliding block that slidingly connects the carriage to the guide;
a control shaft associated to the carriage;
a driving unit suitable for moving said control shaft in rotation;
rotary-translatory connecting means between said control shaft and said guide suitable for causing a forward movement of the carriage along the guide following a rotation of the control shaft;
wherein said control shaft is movable between a working position wherein it is connected to said guide through said connecting means for moving the carriage by said driving unit, and an idle position wherein it is disconnected from said guide for free manual pulling of the carriage through said at least one sliding block.

2. System according to claim 1, wherein said rotary-translatory connecting means comprise a friction element associated to and extending along said guide and an annular element fitted on an end of said control shaft and suitable for interacting with said friction element so as to obtain a rolling friction for moving the carriage subsequent to the rotation of said shaft.

3. System according to claim 2, wherein said annular element comprises at least one rubber wheel, such as an O-ring.

4. System according to claim 1, wherein said rotary-translatory connecting means comprise a rack associated to said guide and a pinion keyed on an end of said control shaft.

5. System according to claim 1, wherein the movement of said control shaft at least between the working position and the idle position can be carried out by acting on said driving unit of the shaft.

6. System according to claim 5, wherein said driving unit is provided with a gripping element at one end and the control shaft at the opposite end.

7. System according to claim 6, wherein said driving unit is connected to the carriage by an oscillation pin that enables the movement of the control shaft between the working position and the idle position.

8. System according to claim 7, wherein said driving unit is elastically influenced to remain and return to the position of connection of the control shaft to the guide.

9. System according to claim 1, wherein said driving unit comprises means for manually moving the control shaft.

10. System according to claim 1, wherein said driving unit comprises an electrical motor.

11. System according to claim 10, wherein said electrical motor is seated in a bush hinged to a portion of the carriage structure by a support bracket, wherein the control shaft is connected to the motor and protrudes from an end of said bush, and wherein the gripping element is provided at the opposite end of said bush.

12. System according to claim 10, wherein said electrical motor is directly attached to a support bracket hinged to a portion of the carriage structure.

13. System according to claim 11, wherein said oscillating support bracket is anchored to an elastic element attached to the carriage structure and suitable for maintaining and returning the driving unit to the working position.

14. System according to claim 12, wherein the control shaft is suitable for receiving the motion from a driving shaft on which the gripping element is keyed for a manual movement of the control shaft.

15. System according to claim 11, wherein there are provided means for powering the electrical motor by sliding contacts suitable for allowing the rotation of the body of the electrical motor, and wherein the gripping element is directly keyed on said body of the electrical motor.

16. System according to claim 1, further comprising a detecting band associated to the guide, parallel to the sliding direction of the carriage, and carrying a position-signal variable on the basis of the distance from an end of said band defining a zero position, a detection sensor integral with the carriage and suitable for detecting said position-signal, and a control unit suitable for receiving information relating to the signal detected by said sensor and for providing information representing the carriage position relative to said zero position.

17. System according to claim 16, wherein said sensor is suitable for detecting the position-signal without contacting the band.

18. System according to claim 17, wherein said sensor is suitable for detecting the position-signal in a substantially uninterrupted manner while the carriage is moved along the guide.

19. System according to claim 18, wherein the detecting band is a magnetic band and wherein the sensor is a magnetic field sensor.

20. System according to claim 18, wherein the detecting band is an optical band and wherein said sensor is an optical sensor.

21. System according to any claim 16, wherein the position-signal carried by said detecting band is of incremental type.

22. System according to claim 16, wherein the position-signal carried by said detecting band is of absolute type.

23. System according to claim 16, wherein the control unit is associated to a unit for storing position values taken by the carriage.

24. System according to claim 23, wherein the control unit is suitable for comparing the value of the current position of the carriage with a stored position value, the carriage being controllable to be moved along the guide until the difference between said values decreases to zero.

25. System according to claim 23, wherein the control unit is adapted for controlling by feedback the electrical motor for moving the carriage to a previously stored position.

26. System according to claim 10, wherein the electrical motor is suitable for being controlled to rotate to at least two speeds, slow and fast.

27. System according to claim 23, wherein the control unit is programmed for switching the rotation speed of the electrical motor from fast to slow when the carriage approaches a target-position previously stored.

28. Equipment comprising a guide, at least one carriage carrying a respective device to move along a direction defined by said guide, and a system for moving said at least one carriage along said guide according to claim 1.

29. Equipment according to claim 28, wherein said guide is associated to a detecting band carrying an absolute position-signal, and wherein on said guide there are mounted multiple carriages, each having its own sensor suitable for detecting a respective position-signal so as to be movable along the guide independently of the other carriages.

30. Equipment according to claim 28, wherein the electrical/electronic devices mounted on each carriage are powered and/or controlled by a contact-less electromagnetic induction system.

31. Equipment according to claim 30, wherein the guide is associated to the primary circuit of a transformer, whereas the carriage is associated to a secondary circuit.

32. Equipment according to claim 31, wherein said primary circuit is of the flat type, based on a strip of special material with a length equal to the carriage stroke, on said strip there being obtained a series of tracks that have the function of coils of a primary circuit.

33. Equipment according to claim 31, wherein on each carriage there is mounted an electronic board with microprocessor, provided with an accumulator that is constantly recharged by the voltage generated by induction, and suitable for controlling all the functions the carriage is intended for.

\* \* \* \* \*